United States Patent [19]

Pollock

[11] Patent Number: 5,613,339
[45] Date of Patent: Mar. 25, 1997

[54] DECK PLANK AND COVER

[75] Inventor: Eugene B. Pollock, Assumption, Ill.

[73] Assignee: Heritage Vinyl Products, Inc., Macon, Miss.

[21] Appl. No.: 160,436

[22] Filed: Dec. 1, 1993

[51] Int. Cl.$^6$ .............................. B63B 35/44; E04C 3/00
[52] U.S. Cl. .................. 52/731.1; 52/731.3; 52/177;
52/732.2; 52/220.5; 114/263; 114/84; 114/85
[58] Field of Search .................... 52/220.2, 220.5,
52/177, 181, 720, 727, 730.1, 730.7, 731.1,
731.3, 732.1, 732.2, 737.6; 114/84, 85,
263, 266, 267; 405/4; 119/28

[56] References Cited

U.S. PATENT DOCUMENTS

| | | |
|---|---|---|
| 608,861 | 8/1898 | Horton ...................... 52/731.3 |
| 965,595 | 7/1910 | Nicholson . |
| 1,923,544 | 8/1933 | Leonard et al. . |
| 2,178,388 | 10/1936 | Beckman . |
| 2,681,716 | 6/1954 | Black ...................... 52/730.1 X |
| 3,229,433 | 1/1966 | Miles ...................... 114/85 X |
| 3,470,666 | 10/1969 | Mod et al. . |
| 3,528,391 | 9/1970 | Johnson ...................... 119/28 |
| 3,545,150 | 12/1970 | Butler ...................... 52/220.5 |
| 3,587,503 | 6/1971 | Stehr . |
| 3,620,027 | 11/1971 | Nordell . |
| 3,722,473 | 3/1973 | Vickstrom ...................... 119/28 |
| 3,964,221 | 6/1976 | Berquist . |
| 3,999,397 | 12/1976 | Albery . |
| 4,078,515 | 3/1978 | Svirklys . |
| 4,194,330 | 3/1980 | Smith ...................... 52/177 |
| 4,266,381 | 5/1981 | Deller . |
| 4,349,297 | 9/1982 | Misener . |
| 4,352,597 | 10/1982 | Kay . |
| 4,566,243 | 1/1986 | Dahlin ...................... 52/177 X |
| 4,713,924 | 12/1987 | Toti ...................... 52/731.2 |
| 4,885,882 | 12/1989 | Forshee ...................... 52/727 X |
| 4,892,052 | 1/1990 | Zook et al. . |
| 4,907,387 | 3/1990 | Turnbull ...................... 52/177 |
| 4,947,595 | 8/1990 | Douds et al. ...................... 52/730.1 X |
| 5,009,045 | 4/1991 | Yoder . |
| 5,031,083 | 7/1991 | Claesson ...................... 52/732.2 X |
| 5,048,448 | 9/1991 | Yoder . |
| 5,280,692 | 1/1994 | Patey ...................... 52/731.1 X |
| 5,351,458 | 10/1994 | Leite ...................... 52/177 X |

OTHER PUBLICATIONS

Brock Dock Section Kits With Stringers Retail Price List, Brock Manu., Sep. 1, 1989.
Brock Dock Bumper System Retail Price List, Brock Manu., Apr. 15, 1992.
Pamphlet/"They will never go back to wood."/1990 Brock Manufacturing.

*Primary Examiner*—Robert Canfield
*Attorney, Agent, or Firm*—Polster, Lieder, Woodruff & Lucchesi

[57] ABSTRACT

A deck plank (1) of the present invention comprises a plank member (5) adapted to be secured directly to and to span between two or more support members (3), such as the joists of a dock structure or of a residential deck. The plank member is an elongate member having a bottom adapted to bear directly on the support members. The plank member is provided with at least one stiffening member (15). A cover (7) is removably secured to plank member so as to be supported at least in part by the stiffening members and so as to constitute an upper surface of the deck plank upon which a person may walk.

26 Claims, 5 Drawing Sheets

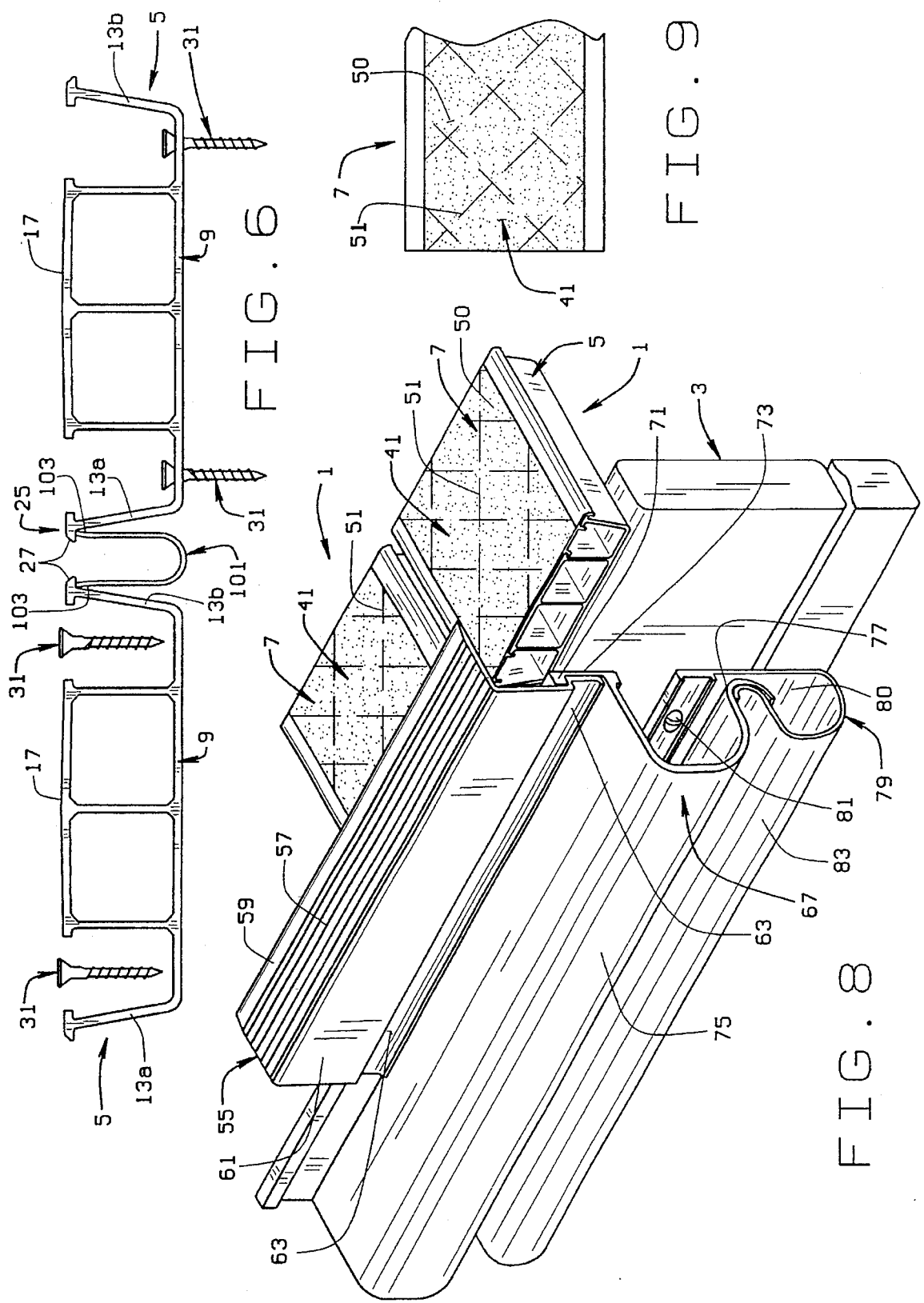

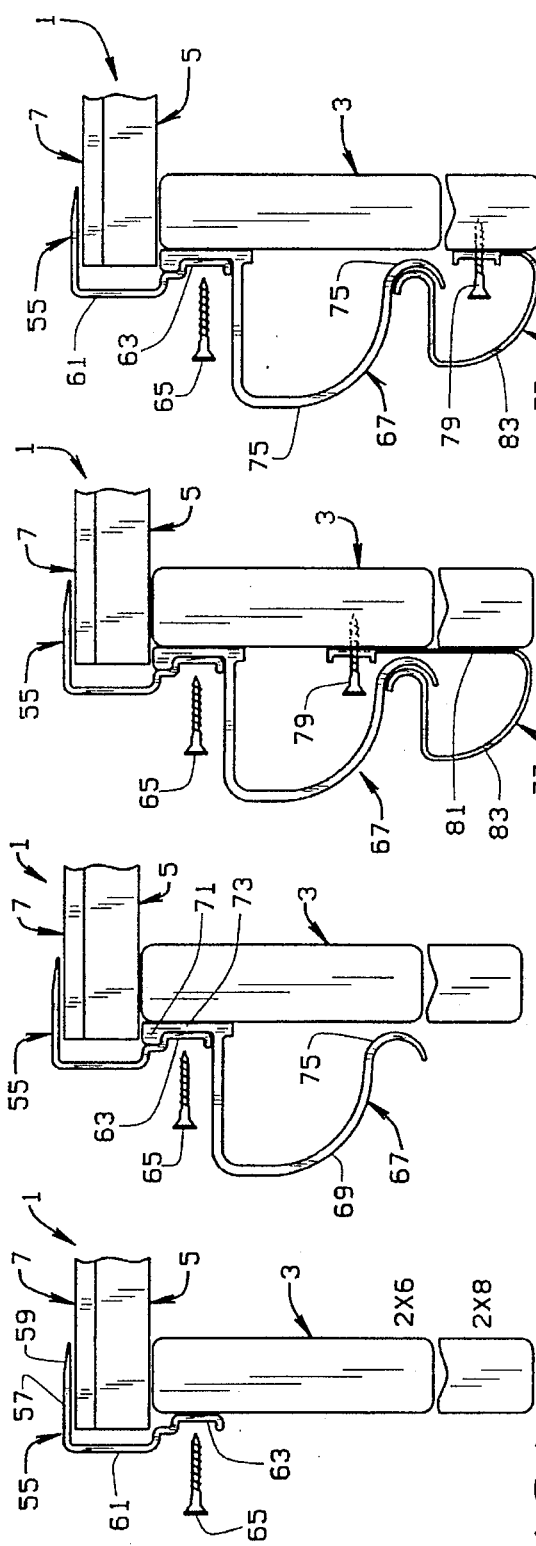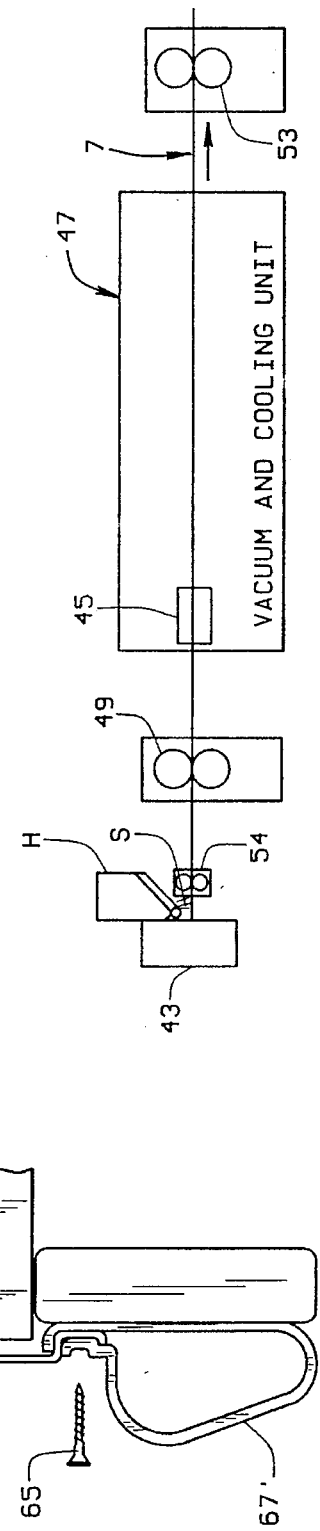

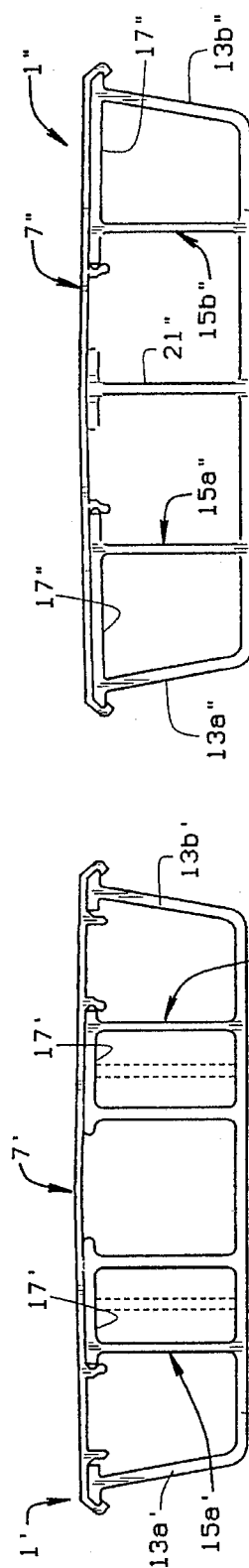
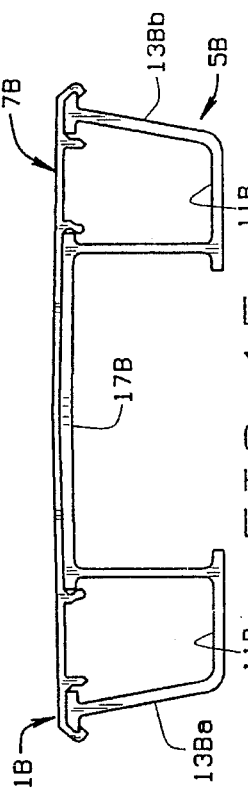
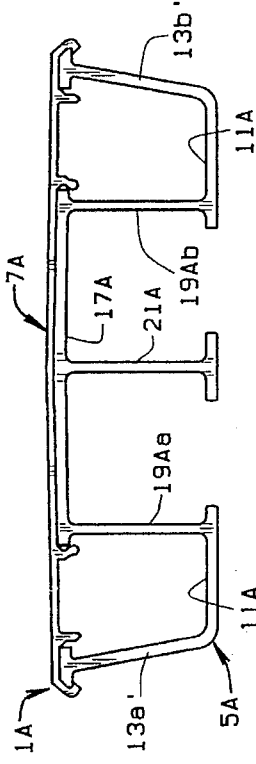
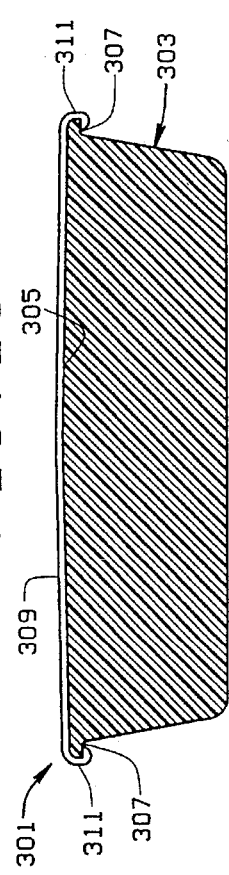
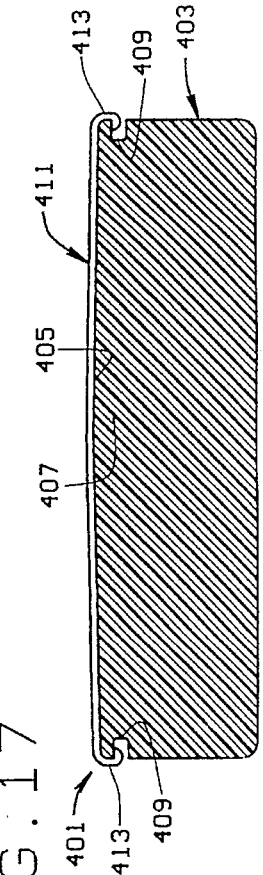
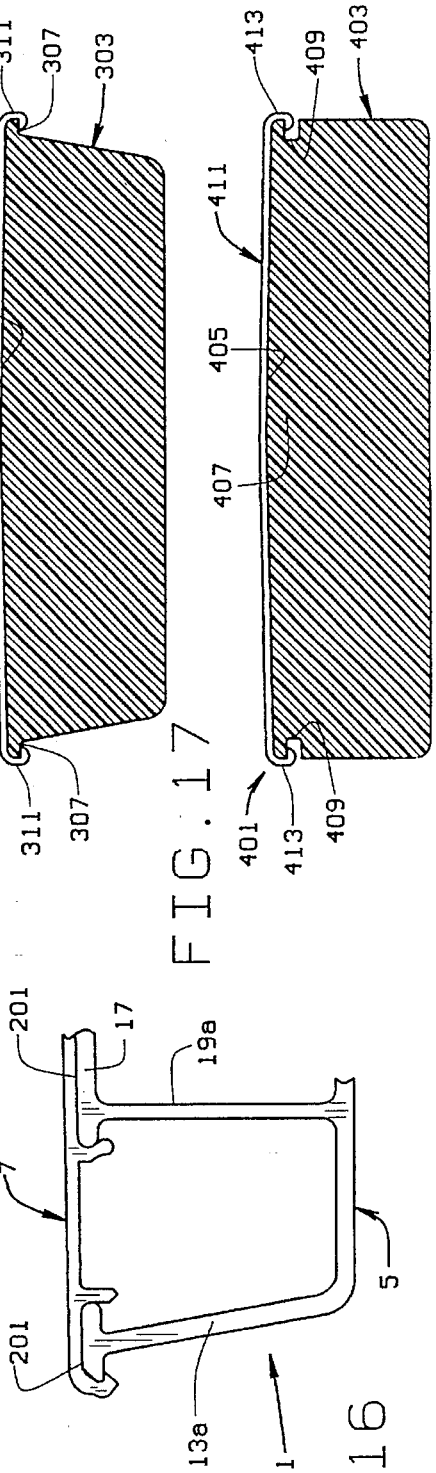

DECK PLANK AND COVER

BACKGROUND OF THE INVENTION

This invention to a deck plank for use on a boat dock, a residential deck, a hog farrowing house floor, or the like where the deck plank is extruded from a suitable synthetic resin, such as polyvinyl chloride (PVC) or the like, such that the deck plank is light in weight and is resisitive to weathering without the need of painting or other maintenance upkeep. In this disclosure, it will be understood that the deck plank of this invention may have many uses, but, for the sake of simplicity, the primary application disclosed herein will be in the context of a deck plank for a boat dock.

Typically, a boat dock has a number of pilings sunk in the bottom on the body of water with joists or other horizontal support members secured to the pilings. In the case of a floating dock, a horizontal frame is supported by floatation members mounted within the frame. These dock joists or frames have deck planks secured to the horizontal support members for forming a deck on which persons may walk. In the past, the conventional dock construction technique was to use wooden joists and frame members of 2×6, 2×8, or 2×10 lumber, or the like. The deck planks were conventionally 2×6 or 2×8 lumber fastened to the top surfaces of the joists with a slight gap (e.g., ¼ to ½ inch) between adjacent deck planks to permit water to readily drain from the deck. However, wooden deck planks, even when pressure treated lumber is used, tend to deteriorate over time, especially when exposed to the constantly wet environment of a boat dock and when the dock is on a body of salt water. In addition, pressure treated lumber is difficult to paint and some persons object to the natural "greenish" color of most pressure treated lumber. There is also a concern that the preservative used to treat pressure treated lumber may leach out of the lumber and contaminate the water surrounding a dock made of such pressure treated lumber.

Deck planks of materials other than wood, including polyvinyl chloride, have been used, but all of these prior alternative deck plank materials have had their shortcomings. In U.S. Pat. No. 4,078,515 to Svirklys, deck planks of extruded aluminum are disclosed which snap lock on to clips provided on the dock frame. However, such aluminum deck planks are expensive.

Misener, U.S. Pat. No. 4,349,297 describes a boat dock in which plastic resin planks are slideably engaged over tubular metal stringers.

U.S. Pat. No. 5,048,448 to Yoder discloses a boat dock structure including an elongate plank of extruded PVC plastic or the like. The plank has an upper surface which constitutes the walking surface of the plank, with flanges extending down from the sides and center of the plank so as to stiffen the plank. These flanges are the approximate thickness of a similar dimensioned wood lumber plank. The plastic plank described in this prior art patent is secured to the dock joists or support members by means of plastic clips with one clip secured to the upper surface of each of the dock support joists or frame members. Then the planks are snapped into the clips so as to secure the planks to the support members.

SUMMARY OF THE INVENTION

Among the several objects and features of the present invention may be noted the provision of a deck plank for a boat dock, a residential deck, a hog farrowing house floor, a picnic table or the like which has a high strength to weight ratio such that the resulting plank is relatively stiff in relation to the amount of material used in the construction of the plank;

The provision of such a deck plank which is securable directly to the deck support members without the requirement of clips or other attachment members that must first be secured to the deck support members in accurate alignment with one another;

The provision of such a deck plank which readily accommodates a wide range of thermal expansion and contraction of the plank without placing undue stress on the plank or on the support members;

The provisions of such a deck plank in which there is ready access to the fasteners securing the deck plank to the support members;

The provision of such a deck plank in which a cover member having a surface thereon is attached to the plank member such that the top surface of the cover constitutes the walking surface of the deck plank members having an increased coefficient of friction and where the cover hides fasteners used to secure the plank to the support members;

The provision of a deck plank in which the cover members may be installed without requiring the use of even simple hand tools;

The provision of such a deck plank in which the cover members may readily be stripped from the installed deck planks for cleaning purposes or for the purpose changing the color or friction surface of the planks without having to remove the plank members from the dock structure;

The provision of such a deck plank which offers a wide variety of surfaces intended to increase the coefficient of friction of the upper surface of the deck plank member and colors, but which requires only a single plank member design;

The provision of such a deck plank which is so structured that when the planks are installed side-by-side, the planks may be spaced sufficiently close together such that persons wearing high heel shoes will not be in danger of having their heels entrapped in the gap between the planks;

The provision of such a deck plank which is impervious to water rot and to insect infestation;

The provision of such a deck plank in which the walking surface of the plank may be readily provided with a suitable surface having an increased coefficient of friction during manufacturing in such manner as to not significantly increase the cost or the time of manufacturing;

The provision of such a deck plank which may be installed in a manner similar to conventional lumber deck planks without the requirement of special training or tools;

The provision of such a deck plank which may readily be repaired if it is damaged in service merely by replacing the cover; and The provision of such a deck plank which has a long service life, which requires no maintenance, and which is of a cost competitive with conventional treated lumber deck planks.

More specifically, the deck plank of this invention comprises a plank member adapted to be secured directly to and to span between two or more support members (e.g., the joists of a dock structure or of a residential deck). The plank member is an elongate member having a bottom web adapted to bear directly on the support members. A cover is removably secured to plank member so as to constitute an upper surface of the deck plank upon which a person may walk.

Further, the deck of the present invention is intended for use on a boat dock, a residential deck, or for a floor in a hog farrowing house or the like, and the deck comprises a plurality of horizontal support members (e.g., deck support joists) spaced apart from one another. The deck is comprised of a plurality of planks supported on the support members and spanning therebetween. Each plank includes a plank member extruded of suitable synthetic resin material. Each plank has a generally channel-shaped cross section with a bottom web adapted to bear directly on the support members and a side flange at each end of the bottom web extending upwardly from the bottom web. The plank member has a box section integral with and extending up from the bottom web intermediate the outer flanges. The box section has an upper web spaced above the bottom web and an outer web at each side of the box section extending up from the bottom web interconnecting the box section upper web and the bottom web. A cover extruded of suitable synthetic resin material is removably secured to the plank member so as to be supported by the upper portions of the side flanges and the upper face of the box section outer web so as to constitute an upper surface of said deck plank upon which a person may walk.

Other objects and features of this invention will be in pan apparent and in part pointed out hereinafter.

BRIEF DESCRIPTION OF THE DRAWINGS

FIG. 6 (see sheet 3) is an end view of two plank members of the present invention installed side-by-side on a support member with a gap between the plank members, and further illustrating an optional drip channel wedgingly fitted between the plank members to prevent rainwater from running down between the plank members onto areas below the deck;

FIG. 8 is a perspective view of the ends of a number of plank members supported by a transverse support member (e.g., a 2×6 or a 2×8 lumber support) under the ends of the plank members with a tread protector (as shown in FIG. 7) installed on the outer ends of the plank members and a deformable bumper installed on the support member;

FIG. 9 is a plan view of a portion of the cover illustrating a increased coefficient of friction surface formed on the cover to aid in reducing slipping of the cover;

FIGS. 10A–10E illustrate different bumpers of the present invention as they are installed on the ends of the plank members and on the support members where the support members are either of 2×6 or 2×8 lumber;

FIG. 11 is a diagrammatic view of a process for providing a increased coefficient of friction surface on the plank cover in which sand is imbedded in the upper surface of the plank cover immediately after the plank cover is extruded and it is still in a semi-plastic state;

FIGS. 12–15 illustrate alternate embodiments of the deck plank shown in FIGS. 1–11, above;

FIG. 16 is an enlarged view of FIG. 1 illustrating the provision of an optional co-extruded layer formed on the lower surface of the cover in the local areas where the cover is supported by the upper ends of the plank member flanges and the upper face of the box section upper web so as to enhance the friction between the cover and the plank member and to prevent squeaking of the cover on the plank as persons walk on the cove;

FIG. 17 is a cross sectional view of an alternative embodiment of the plank and cover of the present invention in which the plank member is a solid core plank made of extruded re-cycled plastic resin and in which the cover is similar to the cover of FIGS. 1–16;

FIG. 18 is a cross sectional view of still another embodiment in which the plank member is a solid wood plank having a cover, as described above, snapped thereto.

Corresponding reference characters indicated corresponding parts throughout the several views of the drawings.

DESCRIPTION OF PREFERRED EMBODIMENTS

Figure 1:
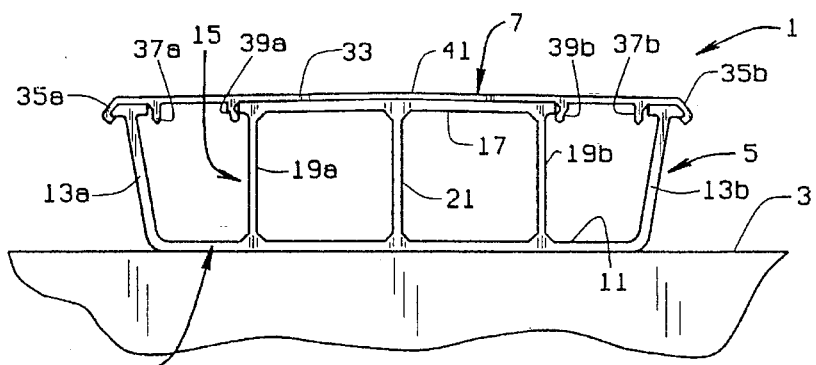
FIG. 1 is an end view of a first embodiment of a deck plank of the present invention comprising a plank member secured directly to a deck plank support (shown in phantom) and a cover snap fit secured to the plank member.
Figure 2:
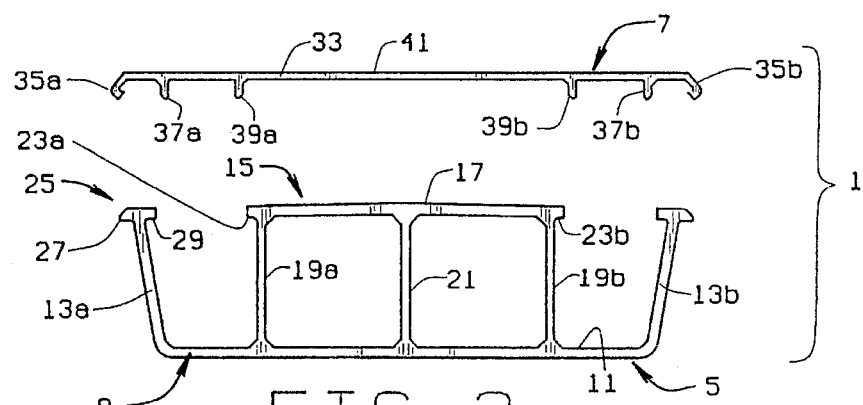
FIG. 2 is an end view of the deck plank shown with the cover removed from the plank member.
Figure 3:
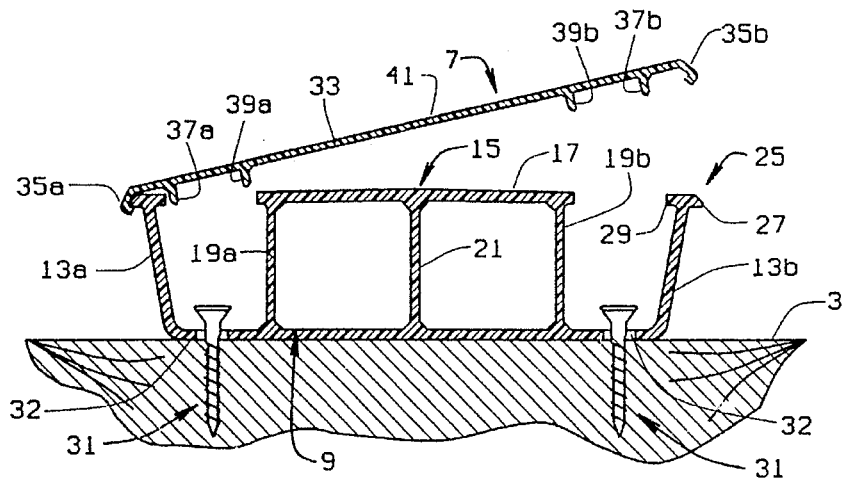
FIG. 3 is an end view of the deck plank showing the plank member secured directly to the deck plank support (shown in phantom) by means of screws and further illustrating the manner in which the cover is snapped on to the plank member.
Figure 19:
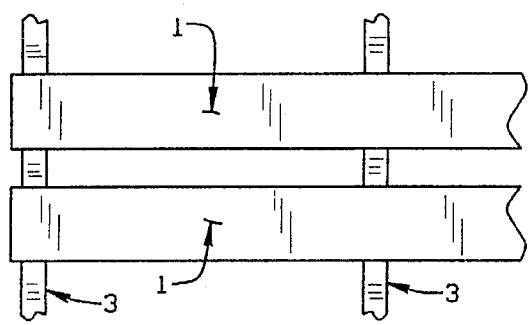
FIG. 19 is a plan view of a deck comprised of a plurality of deck planks of the present invention supported by a plurality of support members.

Referring now to the drawings, and more particularly to FIGS. 1–3, a deck plank of the present invention is indicated in its entirety at 1. The deck plank is shown to be mounted directly on a support member 3 without requiring any mounting members or clips between the support members and the deck plank of this invention. Deck plank 1 is a two-piece member including an elongate plank member 5 and an elongate cover 7 which is removably mounted (snapped) on the plank member for purposes as will appear. The function of the plank member is to span between spaced support members 3 which may, for example, be spaced at regular intervals from one another (e.g., spaced on 16 inch centers), and to carry the loads of persons walking on the deck or of objects placed on the deck. The function of the cover is to serve as a top walking surface for the planks, for hiding the fasteners used to secure the planks to the support members 3, and for having a suitable anti-skid surface thereon (as will be described hereinafter) so as to reduce the tendency of persons from slipping on the planks even under wet or other slippery conditions.

More specifically, plank member 5 is a unitary channel 9 preferably extruded of a suitable synthetic resin, such as polyvinyl chloride (PVC). Channel 9 has a base or bottom web 11 with side flanges 13a, 13b extending upwardly from the ends of base web 11. A box section 15 is integrally formed (i.e., extruded) with the base web. The box section has a box section upper web 17 spaced from base web 11 approximately the depth of plank member 5. Box section upper web 17 is integrally connected to base web 11 by means of box section side webs 19a, 19b and by a box section center web 21. The box section has a height approximately the depth of plank member 5 and substantially reinforces channel 9 such that the channel and the box section act together to efficiently carry substantially all loads when the plank member is supported on spaced support members 3 and spans between the support members. Box section upper web 17 has outwardly extending upper web flanges 23a, 23b at each side thereof. It will be understood that side flanges 13a, 13b and box section 15 constitute means for stiffening plank member 5. As will be described hereinafter in regard to FIGS. 12–15, many variations of these stiffening means may be used.

Side flanges 13a, 13b of channel 9 each have a cross flange, as generally indicated at 25, at its upper end. Each cross flange includes an outer flange 27 and an inner flange 29. As seen in FIG. 3, side flanges 13a, 13b are spaced from box section side webs 19a, 19b a distance sufficient to allow a screw 31 to be inserted in a slot 32 formed in bottom web 11 for securing plank member 5 to the support member 3.

Cover 7 is also an elongate, unitary member preferably extruded on a suitable synthetic resin, such as rigid polyvinyl chloride (PVC). The cover has a main web 33 having an integrally formed outer hook 35a, 35b at each side thereof for fitting around outer flange 27 of cross flange 25 on the upper ends of side flanges 13a, 13b so as to prevent side-to-side relative movement between cover 7 and plank member 5, and because outer hooks 35a, 35b hold their respective outer cross flange captive therein, the hooks tend to positively prevent vertical movement between the cover and the plank member. In addition, inner ridges 37a, 37b are formed on the inner or lower face of cover web 33 and are spaced from their adjacent outer hook 35a, 35b a distance slightly less than the width of cross flange 25 so that as cover 7 is installed on plank member 5, the cross flange 25 is gripped between the outer hook and the inner ridge. Further, cover web 33 has a pair of center ridges 39a, 39b formed on the inner or bottom face of the cover web with the center ridges being spaced apart a distance only slightly greater than the width of box section upper web 17 and box section upper web side flanges 23a, 23b such that when cover 7 is installed on the plank member, center ridges 39a, 39b cooperate with side flanges 23a, 23b so as to hold the cover on the plank member and, more particularly, to hold the center section of the cover on the box section 15. In this manner, cover 7 may be readily snapped on plank members 5 with the cover supported by the upper faces of cross flanges 25 at the outer margins of the plank member and with the center portion of the cover member being supported by the upper web 17 of the box section 15.

It will be appreciated that with cover 7 being preferably continuously extruded from a plastic material, such as PVC, and with cover web 33 being relatively thin in relation to its width, the cover does not substantially contribute the load carrying ability of plank member 5. In fact, cover 7 is sufficiently flexible that following extruding and subsequent forming operations, long continuous lengths of the cover may be rolled in a roll (not shown) so as to conserve space during shipping. For installation of the rolled up cover on a plank member 5, with the plank secured to support members 3, the cover is unrolled to the length of the plank member and is cut to the length of its respective plank member. When the cover is snapped onto the plank member (in a manner as will be described), outer hooks 35a, 35b and center ridges 39a, 39b are sufficient to hold the cover flat on the plank member and on box section 15.

Figure 4:
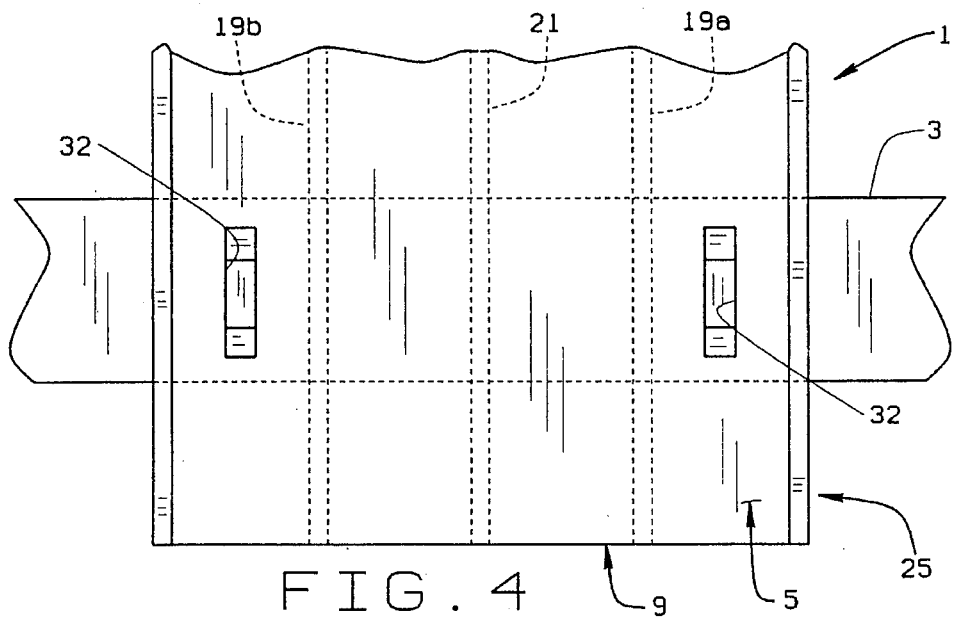
FIG. 4 is a view of the plank member properly positioned on its support members and inverted so that elongate slots may be cut in the bottom web of the plank member in the location of the support member so as to accommodate the installation of fasteners (screws) through the slots and into the support members when the plank member is inverted from its position as shown with the slots substantially centered on the upper face of a respective support member.
Figure 5:
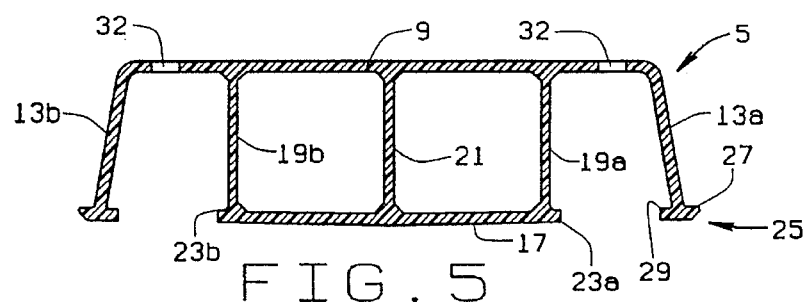
FIG. 5 is an end view of the plank member shown in FIG. 4 illustrating the location of the slots cut in the plank member.
Figure 7:
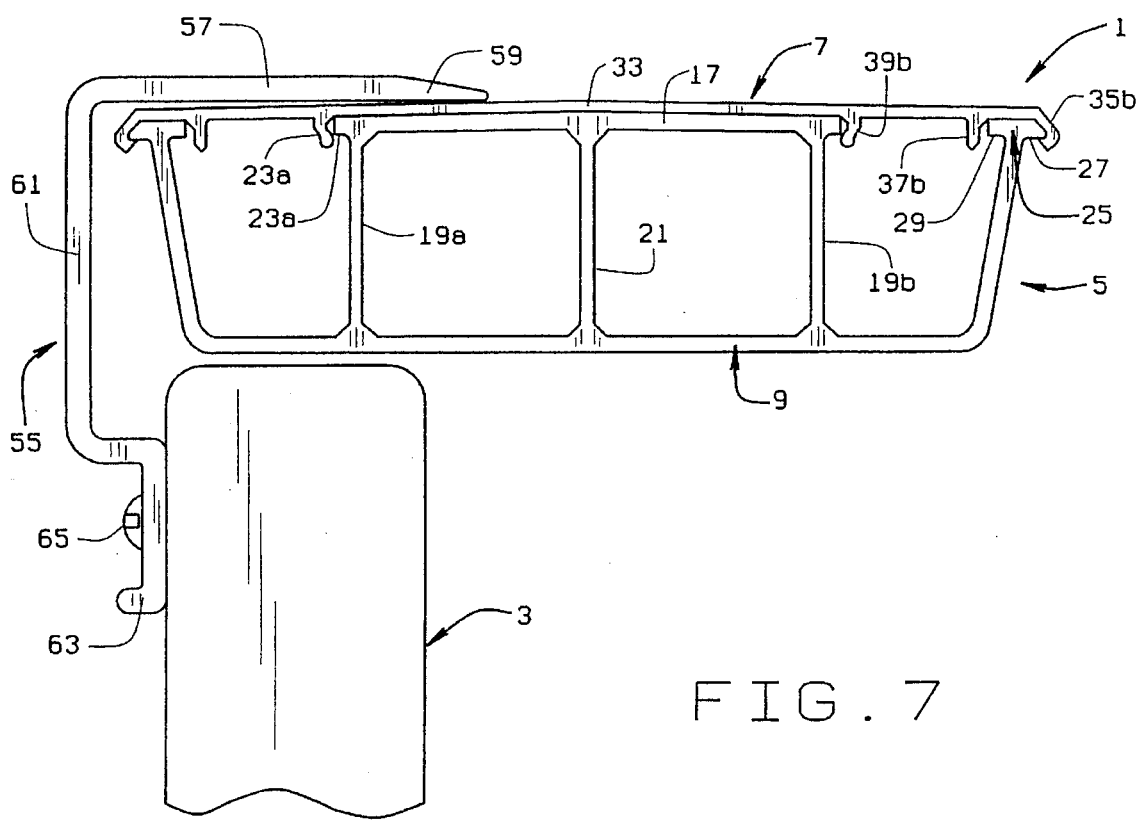
FIG. 7 (see sheet 2) is an end view of a deck plank of the present invention supported by a support member with the support member extending longitudinally of the plank member instead of transversely (as shown in FIG. 1) such as the plank member may be used as a stair tread with the plank member having a tread protector overlying the exposed outer surface of the plank member and the support member.

As noted above, both plank member 5 and cover 7 are preferably unitary members extruded from PVC or other suitable resins. Those skilled in the art will appreciate that the type of PVC used to extrude the plank member and the cover may vary, depending on the supplier of the resin, the strength characteristics desired for the plank and the cover, the degree of ultraviolet light protection desired, the colors desired and many other factors. However, one resin that is used to manufacture plank 5 and cover 7 is Oxyblend 1130 PVC resin commercially available from Occidental Chemical Corporation of Dallas, Tex. This resin is a PVC dryblend compound particularly well suited for high output extrusion and is formulated for outdoor applications requiring toughness and color hold. It will be understood that other blends of PVC may be used and the choice of what particular resin to be used depends on the extrusion equipment being used. In order to install deck planks 1 on support members 3 so as to form a boat dock, a residential deck, a hog farrowing house floor, or other deck structure, plank members 5 without covers 7 installed are placed on support members 3 and are cut to their desired length. It will be appreciated that the PVC plank members and the covers 7 may be cut to length using conventional wood saws preferably equipped with tungsten carbide tipped cutting blades. With plank members 7 in their desired positions on support members 3, the plank members are turned over on the support members, as shown in FIG. 4, and are supported on the support members. Then, slots 32 are cut in base web 11 of the plank member between box section side webs 19a, 19b, preferably from the outside of the plank member by means of a portable electrically driven saw (not shown) having a rotary driven circular abrasive saw blade of relatively small diameter. Such saws are more conventionally used in conjunction with wood working for sawing slots in adjoining wood members for receiving a joining "biscuit". Then, after all of the slots for all of the support members are cut in the base web 11, the plank member is turned over from its position shown in FIG. 5, the slots are aligned with their respective support members and screws 31 are inserted in their respective slots 32 and are forcefully driven into the upper faces of the support members thereby to directly secure the plank members to the upper faces of the support members. Optionally, a washer (not shown) may be installed on screws 31 prior to the screws being inserted in the support members such that the washers bear on the upper face of web 11.

As seen in FIG. 4, elongate slots 32 extend lengthwise of the plank member and are considerably longer than the diameter of screws 31 received in the slots. Thus, when screws 31 are inserted in the slots and are driven into support members 3, the plank member is securely fastened directly to the support members. The friction of the head of screws 31 engaging the upper face of plank member web 11 surrounding slots 32 hold the plank member securely on the support so that under normal loading of the plank members, the plank members will not shift on the support members. However, because the plank members will be subjected extreme weather and temperature conditions, and because there may be extreme temperature differences between the plank members and the supporting members 3, and because the deck planks are of a different material than the support members, the plank members may be subjected to extreme thermal stresses if such thermal stress are not properly relieved. With the provision of elongate slots 32, it will be appreciated that if the thermal stresses in the plank members build up to certain levels, the plank members in the areas they are held by screws 31 may slid relative to the screws thus relieving the build-up of such thermal stresses. Alternatively, such thermal stress may be accommodated by using an oversize circular hole for receiving the screws and by placing a washer between the head of the screw and the adjoining portions of web 11 of the plank member. In this way, the plank is gripped by the screw, but upon the buildup of thermal stresses, the plank can slip relative to the washer thereby relieving stress in the plank member.

Plank members 5 are secured to support members 3 by screws 31 with a gap between adjacent plank members ranging between about ¼ and ½ inch so as to permit rainwater and the like to drain from the upper faces of the planks and covers. Of course, after plank members 5 are secured to the support members 3, the cover members are installed on their respective plank members 5. As noted, cover members are preferably shipped to the job site as an elongate, unitary member rolled up in a roll so as to conserve space in shipping the covers, and then are cut to the length of the channel members. More particularly, with plank members secured to support members 3 and with the cover members 7 cut to the length of their respective plank members, one of the outer hooks 35a. 35b on the cover (for example, hook member 35a) is positioned relative to its respective cross flange 25, as shown in FIG. 3, and the cover is rotated downwardly about this outer hook 35a such that the adjacent inner ridge 37a is engaged by the inner edge of inner flange 29 such that cross flange 25 is gripped by the hook 35a and by inner ridge 37a. Cover web 33 is sufficiently flexible that it may readily be formed on the upper face of upper box section web 17 so that center ridges 39a, 39b engage flange extensions 23a, 23b and are somewhat forced out beyond their normal positions so as to hold the cover with respect to the on box section 15. Finally, by the installer stepping down on cover 7, the outermost portions of the cover are fully snapped in position of plank member 5. In this manner, the other hook 35b and its respective inner ridge 35b may be pushed down on its respective cross flange 25 and the center ridges 39a, 39b may be slightly spread apart so as to cooperate with box section outer flanges 23a, 23b so as to positively hold the center portion of the cover on the plank member.

It will be understood by those skilled in the art that the dimensions and tolerances of the interfitting parts of the cover and of the plank member are such that with the cover so snapped into position of the plank member that the cover is so tightly secured to the plank member that it will not slide in lengthwise direction on the plank member even when the cover is subjected to above normal starting and stopping loads imposed by pedestrians walking on the cover members. Further, there is sufficient flexibility in the top cover that it fully conforms to the plank member and the cover fits on the plank member with sufficiently tight tolerances that there is no tendency of the cover and the plank member to squeak as pedestrians walk thereon.

It will be further recognized that if it is desired to remove cover 7 from plank member 5, this can readily be accomplished by manually lifting one corner of the cover from the plank member as by prying it free with a screwdriver or other suitable tool, and the peeling the cover from the plank member. The cover is sufficiently flexible that upon lifting and twisting the cover relative to the plank will not cause damage to the cover or the plank and that the hooks 35a, 35b, and the cooperating ridges 37a, 37b deform sufficiently so as to release cross flanges 25 held therebetween. In this manner, the cover of one or more of the deck planks may readily be changed to repair damage to the cover or even to change the color of the entire deck without having to remove plank members 5 from the support members 3. It will also be appreciated that this allows the installer of the deck system of the present invention to stock a single plank member 5 in a single color and to use with this common plank member a variety of covers 7 having different colors and different increased coefficient of friction surfaces thereon. This of course minimizes the amount of inventory that an installer would have to have on hand.

As noted above, the upper surface (or at least selected portions of the upper surface) of cover members 7 may be provided with an increased coefficient of friction surface, as indicated at 41, so as to minimize the tendency for pedestrians to slip on the surface of the deck planks 1, particularly when the deck planks are wet. Preferably, increased coefficient of friction surface 41 is formed on the upper surface of cover 7 immediately after the cover is extruded and while the extruded plastic is still in a plastic or workable state. One preferred method of forming the increased coefficient of friction surface 41 and of giving final shape to hooks 35a, 35b, to ridges 37a, 37b and 39a, 39b is to extrude cover from an extrusion die 43, as shown in FIG. 11, and to form the cover by means of a sizer 45 within a vacuum cooling unit 47 downstream from the extrusion die 45. Sizer 45 is provided with slots that engage the hooks 35a, 35b and ridges 37a, 37b so as to give a final desired shape to these elements. In this manner, the shape and dimensions of the hooks and the ridges can be more precisely controlled, as compared with the "as extruded" dimensions of the cover as it emerges from the extrusion die. The cooling unit 47 cools the cover.

Between extruder 43 and the cooling unit 47, the cover may optionally be engaged by a pair of pressing rolls 49 which may be provided with a pattern of heated forming surfaces for forming the increased coefficient of friction surface 41 which is embossed or pressed into the top surface of the cover. This increased friction surface may be in the form of a pebble or sand pattern 50 (as shown in FIG. 9) pressed or embossed into the upper face of the cover so as to breakup the smooth upper surface of the cover. In addition, surface 41 may be optionally constituted by making cuts 51, as shown in a diagonal pattern in FIGS. 8 and 9, in the top surface of the cover for further aiding in the increase of the coeffcient of friction of the upper face of the cover. These cuts 51 may, for example, be formed by the provision of raised knife blades (not shown) formed on rolls 53 such that when the rolls 51 are heated to a predetermined temperature, the knife blades, upon engaging the cover, will form the knife cuts 51 in the upper surface of the cover. It will be understood that the knife cuts 51 may be formed in combination with a sand or pebble pattern 50. The pressing rolls 53 are preferably heated by passing heat oil or the like through the rolls so as to uniformly heat the rolls and the knife blades thereon to a desired temperature sufficient to carry out the embossing operation or forming of the knife cuts 53 on the upper surface of the cover. Downstream from rolls 53, a cutoff knife (not shown) cuts the continuously extruded cover 7 into lengths suitable for being rolled up on itself for ease of shipping and installation.

In addition, sand S (or other suitable granular material) may be deposited on and at least partially imbedded in the upper surface of cover 7 so as to provide still a further increased coeffcient of friction surface. In accordance with this invention, sand S (preferably but not necessarily heated sand) is distributed from a hopper H on the top surface of the cover as the cover emerges from extruder 45 while the plastic cover is still in a semi-plastic or partially melted condition such that the sand will become at least partially embedded in the cover. In addition, forming rolls 43 and/or pressing rolls 55 may be used to press the grains of sand down into the cover so as to insure a uniform sand coating on the upper surface of the cover and for insuring that at least a portion of the top surfaces of the grains of sand project up above the level of the cover such that a person walking on the cover engages hundreds of grains of sand fixedly embedded in the plastic cover such that the sand provide a good increased coefficient of friction surface. The sand provides a pleasing and different appearance and texture for the cover. It will be further appreciated that a portion of each grain of sand is preferably allowed to extend up above the surface of the cover so that the shoes (or feet) of pedestrians walking on the top surface of the planks are gripped by the sand particles. In addition, the sand particles give the planks a feel different than smooth plastic in that the improved surface has a more natural feel.

It will be appreciated that while virtually any pattern can be embossed or impressed on the upper surface of the cover. Further, the grooves formed by the heated knives offer the advantage that when the heated knifes form cuts 51 in the cover simultaneously relatively sharp edges are forced up from the plane of the cover and thus form distinct gripping surfaces that extend up above any film of water or ice that may be present on the plank member thereby to enhance traction. It will be understood that these edges are not so sharp as to pose any danger of cutting anyone using the planks as a deck.

Also, as can be seen in FIG. 1, the upper surface 17 of box section 15 is formed with a slight crown at its center. Thus, when cover 7 is snapped onto the deck plank member 5, the relatively thin, flexible cover will conform to the shape (and crown) of the box section. It has been found that the pebble pattern 50 embossed in the upper surface of the cover 7 aids in allowing rainwater or the like to more readily drain to the outer edges of the cover. In this manner, it is insured that water will not stand or puddle on the upper surface of the cover, but rather will drain to the sides where it will fall from the cover between the plank members which are installed side-by-side with a slight gap therebetween.

As shown in FIG. 6, an optional snap-in place rainwater collection and diverter channel 101 is provided. More particularly, channel 101 is preferably extruded of a suitable resin, such as PVC, and it has side flanges 103 which are formed to be resiliently biased outwardly from the restrained position, as shown in FIG. 6. In addition, the channel has a base 105 which forms a trough for draining rainwater of the like from the deck. In applications such as in an overhead deck in a multistory apartment building or the like, the channels 101 may be installed between properly spaced plank members 5 by inserting the channels lengthwise between the plank members from one end thereof so that the channel is above the upper faces of support members 3. In this manner, the upper edges of the channel flanges will engage the outer faces of plank member flanges 13a, 13b of adjacent plank members 5 and the channels will be prevented from falling out from between the plank members by the support members therebelow. In that manner, rain water which will drain laterally from the upper surface of the covers 7 due to the crown formed in the upper box section web 17 will drain into the channels 101. Thus, rainwater will be substantially prevented from falling down on persons or things below the deck and the deck will form a substantially rain resistant overhead structure. As shown in FIGS. 7, 8 and 10A–10E, a tread protector, as indicated at 55, may be installed on the upper surface and a vertical surface of a plank 1 where the plank is serving as a step. In addition, the tread protector serves to dress up the edges of a dock constructed from the plank members of the present invention because the tread protector conceals the unfinished details of the plank that may be seen from the side of the plank. The tread protector 55 covers the vertical edge of the plank and gives a more definitive step-like edge for the plank. More particularly, tread protector 55 comprises a unitary, generally angle-shaped member continuously extruded on PVC or the like. The tread protector has a horizontal flange 57 adapted to bear on the upper face of cover 7 from the outer edge of the plank toward the center portion of the plank. The free end of the horizontal flange is tapered, as indicated at 59 so as to minimize the thickness of the outer edge of the flange and to reduce the likelihood that a person would trip on the edge. Tread protector 55 also has a vertical flange 61 which extends down from the upper surface of the plank and provides a smooth vertical face instead of the irregular surface of the plank and the support 3. The bottom end of flange 61 has an inwardly extending shoulder 63 which bears against the outer face of the support member 3. As indicated at 65, a screw may be driven through shoulder 63 so as to secure the tread protector to support member 3. It will be understood that a series of screws 65 may be installed at spaced intervals along the length of the tread protector and that these screws constitute the sole means for securing the tread protector to the plank and to the support member. If the tread protector is properly positioned on the plank and on the support member, in the position shown in FIG. 7, the bottom face of horizontal flange 57 will bear firmly against the upper face of the plank and the vertical flange is properly positioned in front of the plank.

As shown in FIGS. 8 and 10A–10E, in conjunction with tread protector 55 or separate from the tread protector, a bumper assembly, as indicated at 67, may be installed on the vertical, outer face of support member 3 so as to protect the dock from damage in the event a boat or the like bumps into the dock. Of course, the bumper also protects the boat. Specifically, bumper 67 is illustrated in several different embodiments. As shown in FIG. 8, the bumper comprises a first energy absorbing member 69 which has an upper flange 71 which, when used in conjunction with tread protector 55, 21 fits behind lower flange 63 of the tread protector (as shown in FIGS. 8 and 10B–10D) and bears against the outer face of support member 3. All of these bumper embodiments are preferably extruded as unitary members from a suitable PVC plastic resin having such characteristics so as resist cracking and other damage in the event the bumpers are bumped into by a boat or the like. As noted in FIG. 10B, upper flange 71 has a channel-shaped groove 73 in its outer face for receiving the inner face of the lower tread protector flange 63 such that the two flanges are somewhat interlocked together. Of course, screws 65 are installed through both flanges 63 and 71. In the embodiment shown in FIGS. 10B, screw 65 is the sole means of attaching the tread protector and the bumper to the support member.

More particularly, bumper 67 has an outwardly projecting energy absorbing protrusion 75 extending out from the outer face of the support member 3. As illustrated, the lower edge of the protrusion extends back toward support member 3 and has an outwardly extending hook 77 thereon. In the embodiment shown in FIG. 10 B, the hook 77 is free of the support member such that if a boat or the like bumps into bumper 67, the outwardly extending protrusion 75 will deform thus dissipating energy and the hook will bear on and slide against the outer face of the support member thereby aiding in the dissipation of energy. The bumper having the unitary energy absorbing protrusion 75 is shown to be installed on a 2×6 support member 3 and the protrusion is sized to substantially cover the outer face of the 2×6 support.

In the event the support is a 2×8, a bumper extension 79 maybe secured to the outer face of the support member by screws 81. Extension 79 has a support member 80 which bears against and extends down along the outer face of the support. An auxiliary energy absorbing bumper 83 extends out from the support member and has an upper portion which slidingly engages hook 77 such that both of the bumpers protrusions 75 and 83 act independently of one another to absorb energy in the event a boat bumps into support member 3. Another variation of the auxiliary bumper, as indicated at 79a, is shown in FIG. 10 10D. This auxiliary bumper 79a is similar to bumper 79 except that extension 80a is shorter than extension 80.

Referring now to FIG. 10E, still another embodiment of bumper 67 is indicated in its entirety at 67'. This bumper 67' is a one-piece bumper of extruded PVC resin which is secured to the dock support member along with the tread protector by a single fastener 65.

Alternate embodiments of the deck plank of the present invention are shown in FIGS. 12–15. In FIG. 12, a deck plank 1' is shown having two interior box sections 15a' and 15b' integrally formed with the extruded plank. It will be appreciated that the width of the interior box sections 15a', 15b' may be varied as required. It will be further noted that the cover 7' is similar in construction and securement to cover 7 heretofore described. The upper faces of the box sections 15a', 15b' are formed by webs 17' which engage and support the under surface of cover 7'.

In FIG. 13, still another variation of the deck plank is shown in its entirety at 1" This embodiment of the deck plank has an extruded plank member 5" having box sections 13a", 13b" at the outer ends of the plank member. The upper faces of each of these box sections are closed by box section upper webs 17" for supporting the cover 7". A T-shaped central web 21" extends up for the bottom of the deck plank member 5" and supports the central portion of the cover 7".

In FIG. 14, still another embodiment of deck plank 1 is shown where the bottom web 11A is discontinuous where the bottom web 11 of deck plank 1 is continuous (see FIG. 1). Such a plank member design may be advantageous in applications where the plank is not required to carry heavy loads or to span long distances. It will be recognized that such a plank member design will result in considerable resin savings. The remainder of plank 1A is similar to plank 1 heretofore described.

In FIG. 15, still another embodiment of plank 1 is indicated in its entirety by reference character 1B. More specifically, plank 1B is similar to planks 1 and 1A, except that the central webs 21 and 21A, respectively, have been omitted to result in even more resin savings if the strength of these central webs is not required for a particular application.

In FIG. 16, a portion of one end of plank 1, as shown in FIG. 1, is shown on an enlarged scale. As indicated at 201, a layer of a suitable co-extruded resin is formed on either the underside of cover 7 as the cover is extruded or on the upper surfaces of the side flanges 13a, 13b and on the upper surface of upper box section web 17 as the plank member 5 is extruded. Preferably, this co-extruded layer is of a suitable elastomeric resin having a Shore hardness less than the base PVC material from which the cover 7 is extruded. When the cover is properly applied to the plank member, as shown in FIG. 16, the upwardly facing surfaces of the plank member bear on the co-extruded resin thus significantly increasing the friction between the cover and the plank member and cushioning the interface between the cover and the plank member. By increasing the friction, the cover is less likely to shift in lengthwise direction on the plank member. By providing a cushioning layer between the cover and the upper surfaces of the plank member the tendency of the cover to squeak when walked on is greatly reduced.

Referring now to FIG. 17, an alternative embodiment of the deck plank system of the present invention is indicated in its entirety by reference character 301. More particularly, this embodiment comprises a solid core plank member 303 preferably extruded of a suitable blend on re-cycled plastic resin similar to that re-cycled resin which is used for the fabrication of park bench planks or the like. More specifically, plank member 303 is extruded to have an upper surface 305 with a raised crown at its center. Plank member 303 has flanges 307 at each side thereof. The deck plank of this embodiment includes a cover 309 preferably extruded on PVC or other suitable resin. Cover 309 is of generally thin cross section and it has downwardly extending, flexible hooks 311 at each side thereof. These hooks are adapted to engage flanges 307 of plank member 303 so as to secure the cover on the plank. It will be understood that cover 309, like cover 7 heretofore described, is preferably extruded in long continuous lengths and is shipped in a roll. The cover is unrolled on the upper surface of the plank and may be snapped in place by pressing the cover down on the plank with one's foot or the like. In this manner, not even simple hand tools are required for installation and, of course, no fasteners are required. Of course, cover 309 constitutes a surface upon which persons may walk upon. It will be understood that the upper surface of cover 309 may be provided with an anti-skid surface as heretofore described in regard to cover 7. While plank 303 has been described as a solid core plank, it will be understood that the plank may be formed (e.g., extruded) to have lightening holes (not shown) therein so as to save resin without appreciably adversely affecting the ability of the plank member to carry a load. It will be appreciated that the solid core construction (with or without the abovenoted lightening holes) of plank member 303 serves to stiffen the plank member.

In FIG. 18, still another embodiment of the plank system of the present invention is indicated at 401. In this embodiment, the plank member 403 is shown to be a solid wooden plank of coventional 2×6 lumber or the like. More particularly, plank 403 has an upper surface 405 which may have a crown 407 planed thereon. The plank further has kerf slots 409 sawed or otherwise formed in the upper edges of the plank. A cover 411, similar to cover 309, may be secured to plank 403 by unrolling the cover on the plank and by the installer "walking" on the cover to force the cover to conform to the plank such that side hooks 413 on the cover may engage slots 409.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A deck plank comprising:

a plank member adapted to be secured to and to span between two or more support members, said plank member being an elongate channel-shaped member having a bottom web adapted to be supported by said support members and having a side flange at each side of said bottom web, said plank member having means between said side flanges and being integral with said bottom web and extending upwardly therefrom for stiffening said plank member such that when said plank member is supported on said support members said plank member will support a person walking thereon, said stiffening means comprising at least one hollow box section; and a cover removably secured to said plank member so as to be supported by said stiffening means of said plank member with said cover extending along substantially the full length of its respective plank member and said cover constituting an upper surface of said deck plank upon which a person may walk.

2. A deck plank comprising:

a plank member adapted to be secured to and to span between two or more support members, said plank member being an elongate channel-shaped member having a bottom web adapted to be supported by said support members and having a side flange at each side of said bottom web, said plank member having means between said side flanges and being integral with said bottom web and extending upwardly therefrom for stiffening said plank member, said stiffening means comprising at least one box section; and a cover removably secured to said plank member so as to be supported by said stiffening means of said plank member with said cover extending along substantially the full length of its respective plank member and said cover constituting an upper surface of said deck plank upon which a person may walk, said box section having a side web at each side thereof extending up from said bottom web and a top web spaced from said bottom web, each of said side flanges being generally T-shaped in cross section having a side flange web extending up from said bottom web and having and a cross flange at the outer end of said side flange web, the upper surfaces of said cross flanges at each side of said plank member and the upper surface of said box section top web being generally coplanar.

3. A deck plank as set forth in claim 1 wherein said cover comprises a cover web generally of the width of said plank member, said web cover having an upper surface constituting said upper surface of said deck plank and an inner surface bearing against said box section such that said plank member is adapted to carry substantially all the load of a person walking on said deck plank.

4. A deck plank as set forth in claim 2 wherein said cover comprises a cover web generally of the width of said plank member, the upper surface of said cover web constituting said upper surface of said deck plank and the inner surface of said cover web bearing against the upper surfaces of said cross flanges and the upper surface of said box section top web such that said plank member is adapted to carry substantially all the load of a person walking on said deck plank, and wherein said cover has means at each outer margin of said cover for grippingly receiving at least a portion of one of said cross flanges thereby to retain said cover on said plank member.

5. A deck plank as set forth in claim 4 wherein said cover further has means depending downwardly from the under surface of said cover web for engagement with said box section thereby to prevent shifting of said cover with respect to said box section.

6. A deck plank as set forth in claim 5 wherein each of said cross flanges has an inner margin and an outer margin, and wherein said means for grippingly receiving said cross flange comprises a hook at the outer margin of said cover web structured to extend down on the outer margin of said cross flange and to engage at least a portion of the under surface of said cross flange.

7. A deck plank as set forth in claim 6 wherein said cover further has a cooperating ridge formed on the underface of said cover web spaced inwardly from said hook on the outer margin of said cover web a distance so as to cooperate with said hook to positively hold said cross flange captive between a respective said hook and said ridge.

8. A deck plank as set forth in claim 6 wherein said hook is so constructed such that with the hook at one margin of said cover in engagement with its respective said cross flange, the hook at the opposite margin of the cover will snap lock on its respective cross flange upon applying downward pressure thereon so to secure said top cover on said plank member.

9. A deck plank comprising:

a plank member adapted to be secured to and to span between two or more support members, said plank member being an elongate channel-shaped member having a bottom web adapted to be supported by said support members and having a side flange at each side of said bottom web, said plank member having means between said side flanges and being integral with said bottom web and extending upwardly therefrom for stiffening said plank member, said stiffening means comprising at least one box section; and a cover removably secured to said plank member so as to be supported by said stiffening means of said plank member with said cover extending along substantially the full length of its respective plank member and said cover constituting an upper surface of said deck plank upon which a person may walk, wherein said plank member and said cover are formed of a suitable synthetic resin, such as polyvinyl chloride (PVC).

10. A deck plank as set forth in claim 9 wherein said outer surface of said cover has an increased coefficient of friction surface thereon as compared to the remaining structure of said cover.

11. A deck plank as set forth in claim 10 wherein said increased coefficient of friction surface is constituted by sand or other granular material embedded in said outer face of said cover.

12. A deck plank as set forth in claim 10 wherein said increased coefficient of friction surface is constituted by an embossed, roughened surface formed on at least a portion of said outer surface of said cover.

13. A deck plank as set forth in claim 12 wherein said embossed, roughed surface comprises a multiplicity of sand grain-like particles protruding up from said outer surface of said cover.

14. A deck plank as set forth in claim 12 wherein said increased coefficient of friction surface comprises a plurality of marks formed in said upper surface of said cover by a heated roller knife or the like.

15. A deck plank as set forth in claim 2 wherein said side flanges of said plank member and said side webs of said box section are spaced from one another a distance sufficient to permit a fastener to be installed through said bottom web for fastening said plank member to said supporting members.

16. A deck plank as set forth in claim 2 wherein said box section has an intermediate web extending between said bottom web and said top web of said box section.

17. A deck plank comprising a plank member adapted to be secured directly to and to span between two or more support members, said plank member being an elongate member having a bottom adapted to bear directly on said support members, said deck plank member having means integral with said plank member bottom and extending upwardly therefrom for stiffening said plank member so as to support a person walking thereon, and a cover removably secured to said plank member so as to be supported by said plank member so as to constitute an upper surface of said deck plank upon which a person may walk, said cover being of a resilient synthetic resin which is sufficiently resilient so as to permit said cover to be snap secured to said plank member, said cover when snap secured to said plank member being supported at least in part by said stiffening means, said cover when secured to said plank member having an upper surface with a crown thereon such that with said cover installed on said plank member water on the upper surface of said cover drains laterally from the cover.

18. A deck plank comprising:
  a plank member adapted to be secured to and to span between two or more support members, said plank member being an elongate channel-shaped member having a bottom web adapted to be supported by said support members and having a side flange at each side of said bottom web, said plank member having means between said side flanges and being integral with said bottom web and extending upwardly therefrom for stiffening said plank member, said stiffening means comprising at least one box section; and
  a cover removably secured to said plank member so as to be supported by said stiffening means of said plank member with said cover extending along substantially the full length of its respective plank member and said cover constituting an upper surface of said deck plank upon which a person may walk, wherein said plank member is extruded of synthetic resin or the like, wherein said cover has securement means, and wherein said side flange at each side of said plank member cooperates with said cover securement means for securing said cover to said plank member.

19. A deck plank comprising a plank member adapted to be secured directly to and to span between two or more supports, said plank member being an elongate member having a bottom adapted to bear directly on said supports, said deck plank member being of generally rectangular, solid cross section so as to support persons walking thereon when said plank member is spanning between said supports, and a cover of resilient synthetic resin material adapted to be snap secured to said plank member so as to be supported by said plank member and so as to constitute an upper surface of said deck plank upon which a person may walk, said cover having snap securement means for removably securing cover to said plank member, said synthetic resin from which said cover is formed being sufficiently resilient as to permit said cover to be snap secured to said plank member upon an installer pressing said cover onto said plank member with his foot or the like, and said plank member having means at each side thereof cooperable with said cover securement means for the removable snap securement of said cover to said plank member.

20. A deck for a boat dock, a residential deck, or for a hog farrowing house floor or the like, said deck comprising a plurality of horizontal support members spaced apart from one another, and a plurality of planks supported on said support members and spanning therebetween, each said plank comprising a plank member and a cover, said plank member and said cover being extruded of suitable synthetic resin material,
  each said plank member having a generally channel-shaped cross section with a bottom web adapted to be supported on said support members, a side flange at each end of said bottom web extending upwardly from said bottom web, and at least one stiffening member extending upwardly from said bottom web between said side flanges; and
  each said cover being removably secured to a respective said plank member so as to be supported by the upper portions of said side flanges and said at least one stiffening member extending upwardly from said bottom web of said respective said plank member such that said covers for said plank members constitute an upper surface of said deck upon which a person may walk.

21. A deck as set forth in claim 22 wherein said bottom web of each said plank member is discontinuous in transverse direction relative to said plank member.

22. A deck as set forth in claim 21 wherein said cover has a co-extruded layer of a resilient resin on its bottom surface so as to bear on the upwardly facing surfaces of said plank member supporting said cover.

23. A deck as set forth in claim 20 further comprising a drain channel adapted to be installed between adjacent plank members comprising said deck for draining rainwater from the deck without allowing the rainwater to drain below the deck.

24. A deck as set forth in claim 23 wherein said drain channel has a pair of side flanges adapted to resiliently bear against said adjacent plank members, and wherein said drain channel has a base adapted to be supported on the upper faces of said deck support members.

25. A deck plank comprising:
  a plank member adapted to be secured to and to span between two or more support members, said plank member being an elongate channel-shaped member having a bottom web adapted to be supported by said support members, said plank member having a hollow box section integral with said bottom web and extending upwardly therefrom, said box section having an outer flange at each side thereof extending up from said bottom web, said box section further having an outer web generally parallel to said bottom web with said outer flanges connecting said outer web to said bottom web; and
  a cover removably secured to said plank members so as to be supported at least in part by said box section outer web so as to constitute an upper surface of said deck plank upon which a person may walk.

26. A deck plank for forming a surface upon which persons may walk comprising:
  a plank member adapted to be secured to and to span between two or more support members, said plank member being an elongate member symmetrical about its longitudinal centerline and having a bottom web adapted to be supported by said support members, said plank member having a side flange at each side of said bottom web, and means integral with said plank member and extending upwardly from bottom web between said side flanges for stiffening said plank member such that said plank member will support a person standing on the portion of said plank member spanning between said support members; and a cover formed of a flexible synthetic resin material which is snap secured to said plank member so as to be supported by said stiffening means of said plank member with said cover extending substantially the length of said plank member and with said cover having an upper surface upon which a person may walk, said cover overlying said plank member side flanges and being connected thereto.

* * * * *